(12) United States Patent
O'Dougherty

(10) Patent No.: US 7,172,096 B2
(45) Date of Patent: Feb. 6, 2007

(54) LIQUID DISPENSING SYSTEM

(75) Inventor: Kevin T. O'Dougherty, Arden Hills, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 250 days.

(21) Appl. No.: 10/988,802

(22) Filed: Nov. 15, 2004

(65) Prior Publication Data
US 2006/0102652 A1    May 18, 2006

(51) Int. Cl.
B65D 35/34      (2006.01)
(52) U.S. Cl. .......................................... 222/100; 222/1
(58) Field of Classification Search ............... 222/100, 222/399, 1, 105, 106; 137/205, 206, 209; 141/114, 2, 18
See application file for complete search history.

(56) References Cited
U.S. PATENT DOCUMENTS 5,727,713 A * 3/1998 Kateman et al. ......... 222/145.6
5,857,590 A * 1/1999 Kao et al. ..................... 222/1
6,021,921 A * 2/2000 Lan et al. ...................... 222/61
6,267,132 B1 * 7/2001 Guarneri ....................... 137/14
6,962,627 B2 * 11/2005 Sekiguchi et al. ........... 118/693
2003/0205285 A1 * 11/2003 Kelly et al. .................... 141/2
2005/0173458 A1 * 8/2005 Hiranaga et al. ............. 222/263
2005/0224523 A1 * 10/2005 O'Dougherty et al. ...... 222/399

* cited by examiner

Primary Examiner—Lien M. Ngo
(74) Attorney, Agent, or Firm—Kinney & Lange, P.A.

(57) ABSTRACT

A system for dispensing liquid to a manufacturing process from a container including an outer container and a flexible inner container occupied by the liquid. A flow passage provides fluid communication between an interior of the inner container and the manufacturing process. A pressurized fluid source is in fluid communication with a space between inner walls of the outer container and the inner container. The pressurized fluid source causes fluid under pressure to flow into the space between the inner walls of the outer container and the inner container to force liquid out of the inner container to the manufacturing process via the flow passage. A pressure sensor is positioned to sense pressure in the flow passage. A controller responsive to the pressure sensor controls the pressure in the flow passage by modulating the pressure from the pressurized fluid source.

30 Claims, 1 Drawing Sheet

LIQUID DISPENSING SYSTEM

BACKGROUND OF THE INVENTION

The present invention relates to the dispensing and delivery of liquids. In particular, the present invention relates to a system for dispensing liquid that allows for easy control of the volume and speed of liquid dispensed from the same input liquid source.

Certain manufacturing processes require the use of liquid chemicals such as acids, solvents, bases, photoresists, dopants, inorganic solutions, organic solutions, biological solutions, pharmaceuticals, and radioactive chemicals. In many manufacturing process applications, fluid containers are employed as a source of process liquids for liquid delivery systems. Typically, the fluid containers are fabricated and filled at locations remote from the end-use facility. After filling the containers at a filling facility, the containers are typically shipped to the end-use facility, such as for use in a manufacturing process.

At the end-use facility, the fluid container is either incorporated directly into a liquid dispensing system or the liquid from the fluid container is emptied directly into a reservoir connected to the liquid delivery system. Liquid dispensing systems allow alternative containers to be used to deliver liquid chemicals to a manufacturing process at a specified time. These process liquids are usually dispensed from the fluid containers by special dispensing pumps.

In the manufacture of thin film transistor flat panel displays, the dispensing and delivery of many expensive chemicals is required. These chemicals include photoresist, color filter material, black matrix material, and so on. These chemicals are typically dispensed in the manufacturing process for spin coating, slit/extrusion coating, or a combination of the two. Systems that dispense these chemicals must be flexible to allow for different amounts of chemical and different dispense speeds to be realized with the same chemical input. Systems incapable of serving this function necessitate redundant dispense equipment, thereby increasing the overall cost of the system.

Most current dispensing systems that allow for different amounts of chemical and different dispense speeds to be realized with the same input liquid source employ dispense pumps in the dispense train. These pumps are not only expensive, but also are known to contribute to contamination in the form of bellows and diaphragm shedding, as well as shedding from wear on the pump check valves. Some systems attempt to engineer around the expensive pumps with an arrangement wherein the liquid is forced out of the container with a drive gas. However, the accuracy and flexibility of the amount and speed of chemical dispensed are difficult to maintain. Further, the drive gas can be forced into the dispensed liquid, thereby causing microbubbles to form in the liquid. The presence of microbubbles in the deposited liquids may cause defects in the deposited layer or subsequent deposited layers.

Another conventional approach to varying the amount and speed of chemical dispensed from the same input liquid source involves using a flow control device in the dispense train. In this type of system, flow rate is controlled via a closed feedback loop, and the volume of the dispense is controlled by the amount of time the liquid is dispensed. However, some dispensing systems using flow control devices have poor stability when a certain amount of liquid must be dispensed in a short period of time. Also, flow control devices are very expensive, thus adding to the overall cost of the dispense system.

Thus, there is a need for a low-cost liquid dispensing system that eliminates the use of pumps and allows for easy control of the amount and speed of fluid dispensed from the same input fluid source.

BRIEF SUMMARY OF THE INVENTION

The present invention is a system for dispensing liquid to a manufacturing process from a container including an outer container and a flexible inner container occupied by the liquid. The system includes a flow passage to provide fluid communication between an interior of the inner container and the manufacturing process. A pressurized fluid source is provided that is in fluid communication with a space between inner walls of the outer container and the inner container. The pressurized fluid source causes fluid under pressure to flow into the space between the inner walls of the outer container and the inner container to force liquid out of the inner container to the manufacturing process via the flow passage. A pressure sensor is positioned to sense pressure in the flow passage. A controller responsive to the pressure sensor controls the pressure in the flow passage by modulating the pressure from the pressurized fluid source.

In one embodiment, the system further includes a stop valve downstream from the pressure sensor for terminating dispensing of the liquid to the manufacturing process when a recipe amount of liquid has been dispensed to the manufacturing process. Also, a suckback valve may be near a manufacturing process end of the flow passage for sucking liquid into the manufacturing process end of the flow passage after terminating dispensing of the liquid to the manufacturing process.

DETAILED DESCRIPTION

Figure 1:
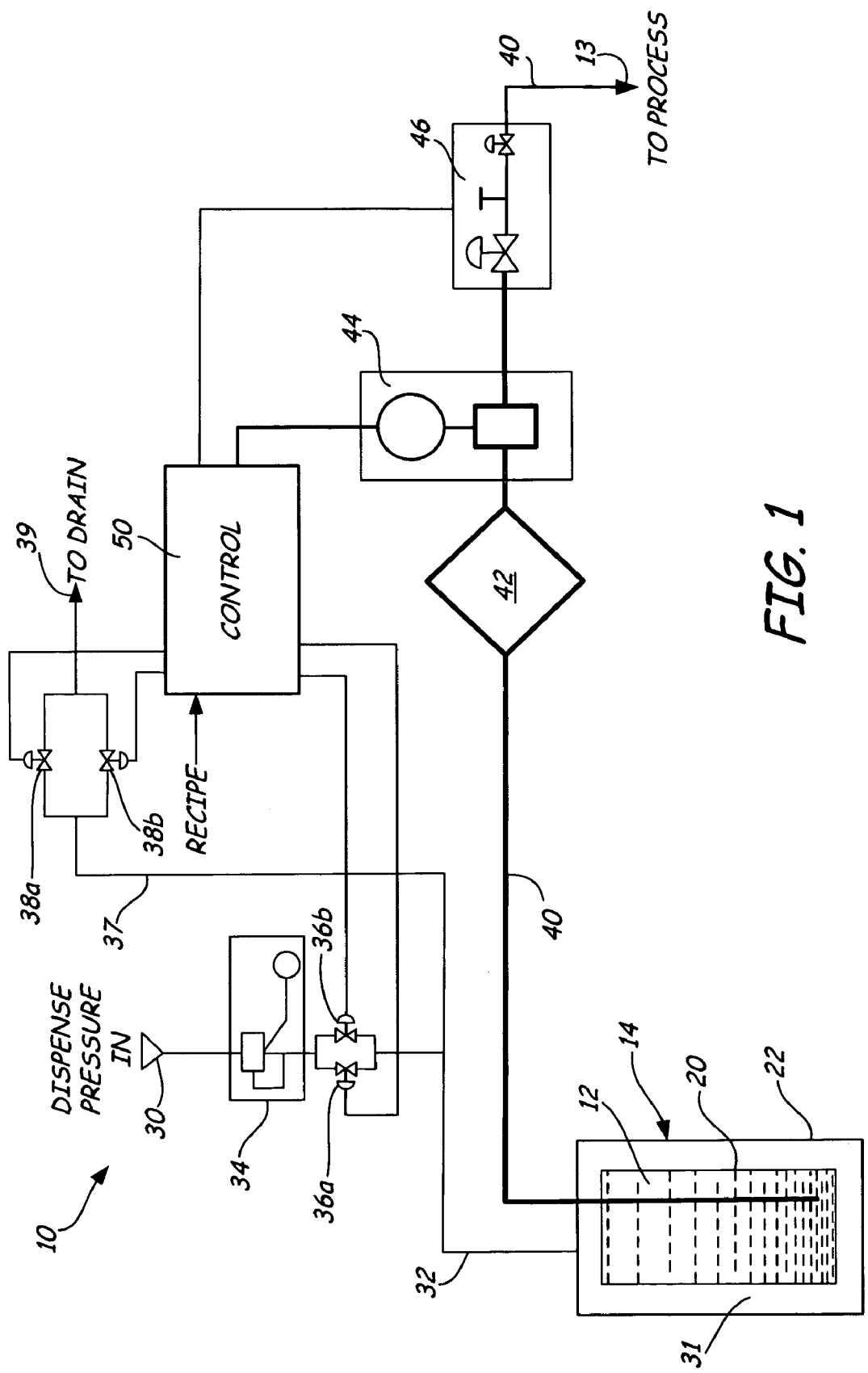
FIG. 1 is a schematic of a liquid dispensing system according to one embodiment of the present invention for dispensing liquid to a manufacturing process.

FIG. 1 is a schematic of liquid dispensing system 10 according to one embodiment of the present invention for dispensing liquid 12 to manufacturing process 13 from container 14. Container 14 includes flexible inner container 20 and rigid outer container 22. System 10 further includes pressurized gas supply 30, pressurized gas passage 32, pressure regulator 34, block valves 36a and 36b, pressure release passage 37, pressure release valves 38a and 38b, pressure release drain 39, flow passage 40, filter 42, pressure transducer 44, stop/suckback valve 46, and controller 50.

Outer container 22 provides the mechanical support and protection required by flexible inner container 20 (e.g., a flexible polymeric bag or liner) during filling, transport, handling, and dispensing. Outer container 22 is typically constructed of metal, although other materials, including plastic materials, may also be used, depending upon government regulatory specifications for handling of the particular liquid to be contained within container 14. Container 14 is, for example, a container as shown in U.S. Pat. No. 5,335,821 to Osgar issued on Aug. 9, 1994, which is herein incorporated by reference.

Pressurized gas supply 30 is connected to compression space 31 (i.e., the space between inner walls of outer container 22 and outer surfaces of the inner container 20) via pressurized gas passage 32. Pressure regulator 34 is connected along pressurized gas passage 32 to regulate the pressure that is provided to block valves 36a and 36b. Block valves 36a and 36b, which in one embodiment are course and fine adjust block valves, respectively, are connected in parallel along pressurized gas passage 32 to modulate the pressure from pressurized gas supply 30 that is provided to pressurized gas passage 32. The use of multiple valves allows for fine-tuning of the air pressure in compression space 31. It will be appreciated that while two block valves 36a and 36b are shown, block valves 36a and 36b may be substituted by any device capable of adjusting pressure to compression space 31 from pressurized gas supply 30 (e.g., a single block valve).

The interior of inner container 20 is in fluid communication with manufacturing process 13 via flow passage 40. Flow passage 40 is typically provided in a probe that is insertable through a port of the container and into inner container 20 to provide fluid communication between liquid 12 and manufacturing process 13. Optional filter 42 is shown connected across flow passage 40. Alternatively, filter 42 may be integrated into container 14. Pressure transducer 44 is connected along flow passage 40 downstream from filter 42. Stop/suckback valve 46 is connected at an end of flow passage 40 proximate to manufacturing process 13.

Controller 50, typically a microprocessor-based controller, is connected to block valves 36a and 36b, pressure release valves 38a and 38b, pressure transducer 44, and stop/suckback valve 46. Controller 50 receives signals from pressure transducer 44 and provides signals to block valves 36a and 36b, pressure release valves 38a and 38b, and stop/suckback valve 46.

In one embodiment of system 10, pressure regulator 34, block valves 36a and 36b, pressure release valves 38a and 38b, filter 42, pressure transducer 44, stop/suckback valve 46, and interfaces to pressurized gas supply 30 and controller 50 are provided in a single package attachable to container 14. The package including the system components listed can then simply be connected to container 14, pressurized gas supply 30, controller 50, and a power supply (not shown) to begin dispensing liquid from container 14 to manufacturing process 13. In conventional systems that include pumps and flow control devices to control the flow of liquid to the manufacturing process, this type of simple connectivity is not possible since these components are not readily integrated into a single package. Furthermore, even if pumps or flow control devices were readily integrated into a single package, the production of many such packages would be very expensive due to the high cost of pumps and flow control devices. It should be noted that alternatively any of pressure regulator 34, block valves 36a and 36b, filter 42, pressure transducer 44, and stop/suckback valve 46 may also be provided individually (that is, not integrated in a single package) at the end-use facility.

In operation, controller 50 receives a dispense recipe as an input (typically input by a user of system 10) that includes a recipe amount of liquid to be dispensed to the manufacturing process and a dispense duration within which the recipe amount of liquid must be dispensed to the manufacturing process. For example, dispense recipe may command system 10 to dispense 30 mL of liquid 12 to manufacturing process 13 in one and a half seconds. As another example, dispense recipe may command system 10 to dispense the 30 mL of liquid 12 to manufacturing process 13 in twelve seconds. The dispense recipe also includes other information about the liquid (e.g., viscosity, density, etc.) and the manufacturing process (e.g., ambient temperature of the process) that controller 50 takes into account during the dispensing process. Controller 50 subsequently provides a signal to stop/suckback valve 46 to open a fluidic path between container 14 and manufacturing process 13. If block valves 36a and 36b are closed, controller 50 also provides a signal to block valves 36a and 36b that causes block valves 36a and/or 36b to open. This causes pressurized gas to flow from pressurized gas supply 30 to compression space 31 via pressurized gas passage 32. In one embodiment, pressurized air supply 30 has a pressure between about 60 and 100 pounds per square inch gauge (psig).

The pressurized gas, preferably compressed air or nitrogen, is supplied to compression space 31 by pressurized gas supply 30 to force liquid 12 through filter 42, pressure transducer 44, and stop/suckback valve 46 via flow passage 40. As liquid 12 is dispensed from inner container 20 of container 14, air is permitted to enter compression space 31, thereby collapsing flexible inner container 20. Optionally, an additional gas passage and pressure regulator (not shown) connected between pressurized gas supply 30 and compression space 31 could be supplied to provide a predetermined constant pressure to compression space 31. This additional connection to pressurized air supply 30 would allow system 10 to reach the desired pressure to compression space 31 more rapidly. It should also be noted that while inner container 20 is collapsed with pressurized gas in this embodiment, any means capable of collapsing inner container 20 to force liquid 12 through flow passage 40 may be used, including hydraulic or mechanical based devices.

When liquid 12 flows through flow passage 40, pressure transducer 44 senses the pressure of liquid 12 flowing through flow passage 40. According to Poiseuille's law (also known as the Hagen-Poiseuille law), the pressure in flow passage 40 at pressure transducer 44 is proportional to the flow rate in flow passage 40. The pressure in flow passage 40 is preferably measured downstream from filter 42 such that dispense accuracy is not affected by filter restriction due to use and impurity retention of filter 42. The pressure sensed by pressure transducer 44 is provided to controller 50. Controller 50 then compares the pressure sensed by pressure transducer 44 to the pressure required to dispense liquid 12 to manufacturing process 13 within the specifications of the dispense recipe (i.e., time of dispense, amount of liquid 12 to dispense to manufacturing process 13, etc.). If necessary, controller 50 then adjusts the pressure from pressurized gas source 30 to compression space 31 by modulating block valves 36a and 36b to increase or reduce the pressure from pressurized gas source 30 at compression space 31.

After the pressure to compression space 31 has been adjusted, the pressure applied to inner container 20 is likewise adjusted, thereby causing a change in flow rate through flow passage 40. This change in flow rate is measured as a corresponding pressure change through flow passage 40 by pressure transducer 44. This closed loop control of the flow rate of liquid 12 to manufacturing process 13 allows system 10 to provide a liquid dispense according to the specifications of the dispense recipe. Furthermore, the ability to vary the flow rate of liquid 12 through flow passage 40 by adjusting the pressure to compression space 31 permits different dispensing recipes to be carried out from the same liquid source.

In one embodiment, block valves 36a and 36b are high speed/high cycle life DC solenoid valves. When controller 50 receives a signal from pressure transducer 44, controller 50 uses a control algorithm to produce a drive signal that controls block valves 36a and 36b based on dispense recipe, manufacturing process, and current pressure parameters. In one embodiment, the drive signals used to control block valves 36a and 36b are pulse width modulated signals. The pulse width modulation carrier frequency is selected based on the response time of the solenoid valves. Controller 50 includes a proportional feedback component to calculate an error signal based on the difference between the current pressure at pressure transducer 44 and the pressure necessary to meet the flow rate specifications of the dispense recipe. This error signal is used by controller 50 to modulate the pulse width of the drive signal provided to block valves 36a and 36b. This results in an adjustment of the pressure supplied to compression space 31. In another embodiment, controller 50 additionally includes derivative and integral feedback components to provide error signals related to the rate of change in pressure over time at pressure transducer 44 and the variation of the rate of change in the pressure signal over time, respectively. These error signals are also used by controller 50 to modulate the drive signal that controls block valves 36a and 36b.

During dispensing, controller 50 controls pressure release valves 38a and 38b as necessary to prevent overpressurization of compression space 31. In one embodiment, pressure release valves 38a and 38b are high speed/high cycle life DC solenoid valves that are controlled by controller 50 with pulse width modulated signals. When controller 50 receives a signal from pressure transducer 44, controller 50 determines whether too much pressure has been supplied to compression space 31. If controller 50 determines that the pressure is too high in compression space 31, controller 50 opens pressure release valves 38a and 38b as necessary to reduce the pressure in compression space 31 to an appropriate level. In one embodiment, pressure release valves 38a and 38b are course and fine adjust block valves, respectively, to allow for fine-tuning of the air pressure in compression space 31. This provides a fluidic path between compression space 31 and pressure release drain 39 via pressure release passage 37, thereby reducing the pressure in compression space 31. Pressure transducer 44 continuously provides a signal to controller 50 related to the pressure in flow passage 40 as the pressure is reduced in compression space 31. When controller 50 determines that the pressure in compression space 31 has reached an appropriate level, controller 50 closes pressure release valves 38a and 38b. Optionally, system 10 may additionally include another pressure release passage (not shown) connected directly to pressure release drain 39 which, when opened, facilitates rapid release of pressure in compression space 31.

When the amount of liquid 12 dispensed to manufacturing process 13 corresponds with the dispense recipe specifications, system 10 terminates dispensing of liquid 12 to manufacturing process 13. Controller 50 sends a signal to stop/suckback valve 46 to terminate the fluidic connection between the interior of inner container 20 and manufacturing process 13. Stop/suckback valve 46 then draws or sucks any liquid 12 that is between stop/suckback valve 46 and manufacturing process 13 back into flow passage 40. This suckback procedure prevents extra liquid 12 from dripping or drooling from flow passage 40 to manufacturing process 13 after the dispense recipe specifications have been met.

Various modifications can be made to the liquid dispensing system heretofore described without departing from the spirit and scope of the present invention. For example, with certain liquid chemicals (e.g., color filter chemicals used to make thin film transistor flat panel displays), it is sometimes desirable to transport and store liquid 12 with a headspace gas in inner container 20 to prevent decay of liquid 12. This headspace gas must be removed prior to dispensing liquid 12 to manufacturing process 13. In order to accomplish this, a headspace gas removal system could be incorporated into system 10, such as that described in U.S. patent application Ser. No. 10/823,127, filed on Mar. 13, 2004, entitled "Liquid Dispensing Method and System with Headspace Gas Removal" by K. O'Dougherty, R. Oberg, J. Menning, G. Eiden, and D. Grant, which is herein incorporated by reference. In addition, container 14 may be filled so as to provide zero headspace in inner container 20 using the method and system described in U.S. Pat. App. No. 2003/0205285, filed on Nov. 6, 2003, entitled "Apparatus and Method for Minimizing the Generation of Particles in Ultrapure Liquids" by W. Kelly and D. Chilcote, which is also herein incorporated by reference. Furthermore, system 10 is expandable to allow for multiple dispense points from a single container 14.

The liquid dispensing system of the present invention offers several advantages over conventional dispensing systems. For example, because system 10 uses no pumps in the dispense train, liquid 12 will be free of contamination common in conventional systems caused by deterioration of pump components. In addition, liquid 12 is shielded by inner container 20 from the pressurized gas that forces liquid 12 through flow passage 40. This prevents gas from being forced into liquid 12 during the dispensing process, thereby preventing the formation of deleterious microbubbles in liquid 12. Plus, the components of system 10 are relatively inexpensive compared to pumps and other flow control devices, thus reducing the cost of the overall dispensing system. Furthermore, the components of system 10 can easily be integrated into a single, transportable package, which allows for quick and simple connection to the manufacturing process at the end-use facility.

In summary, current dispensing systems that allow for different amounts of chemical and different dispense speeds to be realized with the same input liquid source employ dispense pumps or flow control devices in the dispense train. However, these components are expensive, are known to contribute to contamination of the liquid, and can have poor stability. The liquid dispensing system of the present invention addresses these and other drawbacks of conventional liquid dispensing systems. The liquid is dispensed to a manufacturing process from a container including an outer container and a flexible inner container occupied by the liquid. The system includes a flow passage to provide fluid communication between an interior of the inner container and the manufacturing process. A pressurized fluid source is provided that is in fluid communication with a space between inner walls of the outer container and the inner container. The pressurized fluid source causes fluid under pressure to flow into the space between the inner walls of the outer container and the inner container to force liquid out of the inner container to the manufacturing process via the flow passage. A pressure sensor is positioned to sense pressure in the flow passage. A controller responsive to the pressure sensor controls the pressure in the flow passage by modulating the pressure from the pressurized fluid source.

Although the present invention has been described with reference to preferred embodiments, workers skilled in the art will recognize that changes may be made in form and detail without departing from the spirit and scope of the invention.

The invention claimed is:

1. A system for dispensing liquid to a manufacturing process from a container including an outer container and an inner container, the inner container made of a flexible material and occupied by the liquid, the system comprising:

a flow passage to provide fluid communication between an interior of the inner container and the manufacturing process;

a pressurized fluid source in fluid communication with a compression space between inner walls of the outer container and the inner container for causing fluid under pressure to flow into the compression space to force liquid out of the inner container to the manufacturing process via the flow passage;

a pressure sensor positioned to sense pressure in the flow passage; and a controller responsive to the pressure sensor for controlling flow of the liquid in the flow passage by modulating the pressure from the pressurized fluid source.

2. The system of claim 1, wherein the controller is programmable with a dispense recipe comprising a recipe amount of liquid to be dispensed to the manufacturing process and a dispense duration within which the recipe amount of liquid must be dispensed to the manufacturing process.

3. The system of claim 2, wherein the controller controls flow of the liquid in the flow passage based on the dispense recipe.

4. The system of claim 1, wherein the pressurized fluid source comprises:
a clean dry air (CDA) source; and
fluid control means connected between the CDA source and the compression space, the fluid control means responsive to a signal from the controller to adjust a CDA pressure in the compression space.

5. The system of claim 4, wherein the fluid control means comprises a block valve.

6. The system of claim 5, wherein the block valve comprises a solenoid valve.

7. The system of claim 6, wherein the controller modulates the pressure from the pressurized fluid source by providing a pulse width modulated drive signal to the solenoid valve.

8. The system of claim 7, wherein the controller includes a proportional feedback component to determine an error signal used for modulating the drive signal to the solenoid valve, the error signal based on the pressure in the flow passage sensed by the pressure sensor.

9. The system of claim 7, wherein the controller includes a proportional-integral-derivative (PID) feedback component to determine an error signal used for modulating the drive signal to the solenoid valve, the error signal based on the pressure in the flow passage sensed by the pressure sensor.

10. The system of claim 4, and further comprising:
a pressure regulator connected between the CDA source and the fluid control means.

11. The system of claim 1, and further comprising:
a pressure release valve connected between a pressure release drain and the compression space to facilitate release of pressure in the compression space.

12. The system of claim 11, wherein the pressure release valve comprises a block valve.

13. The system of claim 12, wherein the block valve comprises a solenoid valve.

14. The system of claim 13, wherein the controller modulates the pressure from the pressurized fluid source by providing a pulse width modulated drive signal to the solenoid valve.

15. The system of claim 13, and further comprising:
a fluid control valve connected between the pressurized fluid source and the compression space, the fluid control valve responsive to a signal from the controller to increase pressure in the compression space; and
a pressure release valve connected between a pressure release drain and the compression space, the pressure release valve responsive to a signal from the controller to decrease pressure in the compression space.

16. The system of claim 1, and further comprising:
a stop valve downstream from the pressure sensor for terminating dispensing of the liquid to the manufacturing process when a recipe amount of liquid has been dispensed to the manufacturing process.

17. The system of claim 1, and further comprising:
a suckback valve connected near a manufacturing process end of the flow passage for drawing liquid back into the manufacturing process end of the flow passage after terminating dispensing of the liquid to the manufacturing process.

18. The system of claim 1, and further comprising:
a filter connected across the flow passage.

19. The system of claim 1, wherein the flow passage, the pressure sensor, a pressurized fluid source coupling, and a controller coupling are provided in a single package that is connectable to the container.

20. A method of dispensing liquid to a manufacturing process from a container including an outer container and a flexible inner container, the flexible inner container containing the liquid, the method comprising:
providing a liquid flow passage between an interior of the inner container and the manufacturing process;
supplying pressurized fluid in a compression space between the inner container and the outer container to dispense liquid from the inner container to the manufacturing process via the liquid flow passage;
sensing pressure in the flow passage; and
controlling the pressure in the flow passage by modulating a pressure of the pressurized fluid.

21. The method of claim 20, wherein modulating a pressure of the pressurized fluid comprises:
adjusting at least one fluid control valve connected between a pressurized fluid source and the compression space.

22. The method of claim 21, wherein adjusting at least one fluid control valve comprises providing a pulse width modulated drive signal to the at least one fluid control valve.

23. The method of claim 20, and further comprising:
terminating dispensing of the liquid to the manufacturing process when a recipe amount of liquid has been dispensed to the manufacturing process.

24. The method of claim 23, and further comprising:
drawing liquid into a manufacturing process end of the flow passage after terminating dispensing of the liquid to the manufacturing process.

25. A liquid handling system comprising:
a container including an outer container and a flexible inner container, the flexible inner container containing a liquid; and
a connector attachable to the container, the connector comprising:
a probe insertable into the inner container and having a flow passage therein;
a pressurized fluid source coupling for interfacing with a pressurized fluid source such that the pressurized fluid source is in fluid communication with a compression space between inner walls of the outer container and the inner container for causing fluid under pressure to flow into the space between the inner walls of the outer container and the inner container to force liquid out of the inner container via the flow passage;

a pressure sensor for sensing pressure in the flow passage; and a controller coupling for interfacing with a controller that is responsive to the pressure sensor, the controller controlling flow of the liquid in the flow passage based on a signal from the pressure sensor by modulating the pressure from the pressurized fluid source.

26. The liquid handling system of claim 25, wherein the connector further comprises a stop valve for terminating dispensing of the liquid.

27. The liquid handling system of claim 25, wherein the connector further comprises a suckback valve for drawing liquid back into the flow passage after terminating dispensing of the liquid.

28. The liquid handling system of claim 25, wherein the connector further comprises a filter connected across the flow passage.

29. The liquid handling system of claim 25, wherein the controller is programmable with a dispense recipe comprising a recipe amount of liquid to be dispensed and a dispense duration within which the recipe amount of liquid must be dispensed.

30. The liquid handling system of claim 29, wherein the controller controls pressure in the flow passage based on the dispense recipe.

* * * * *